Oct. 22, 1957   M. J. M. DE MILLEVILLE   2,810,406
PRESSURE-BALANCED FILLING METHOD FOR LIQUIDS SUCH AS GASSY
LIQUIDS AND DEVICES FOR CARRYING OUT THIS METHOD
Filed July 31, 1953   9 Sheets-Sheet 1

Fig-6

United States Patent Office 2,810,406
Patented Oct. 22, 1957

2,810,406

PRESSURE-BALANCED FILLING METHOD FOR LIQUIDS SUCH AS GASSY LIQUIDS AND DEVICES FOR CARRYING OUT THIS METHOD

Marie Joseph Maurice de Milleville, Paris, France

Application July 31, 1953, Serial No. 371,598

Claims priority, application France May 18, 1953

19 Claims. (Cl. 141—6)

The present invention relates to a method of pressure-balanced filling for liquids, either gassy or not, to be drawn under pressure.

Filling machines are known wherein, through the operation of a suitable cock with multiple ducts, each vessel to be filled is connected first to suction means for being evacuated, then to the gaseous atmosphere of a tank containing the gassy liquid for being filled with the gas of said tank, usually carbonic gas, under the pressure existing in said tank, whereafter the liquid is allowed to flow from the tank into the vessel, the gas then driven out being either fed back to the tank or drained off in order to avoid pollution of the tank.

In such fillers, a vertical tube necessarily extends through the liquid in the tank at the location of each filling head to open into the gaseous atmosphere of the tank. This set of tubes has a stirring effect on the liquid mass, which consequently gets unsaturated, a consequence which is highly unfavorable for obtaining a good quality drink in the filled vessels. If the foam and the gases driven out of the vessels are fed back to the tank, the above disadvantage is made still worse by the double number of tubes required. Moreover, in such machines, the pressures within the various spaces are as a rule exactly equal, which may cause certain disadvantages.

According to the invention, the drawbacks of the known devices, such as tubes extending into the tank, are fully removed and the rate of flow of the filling liquid is controlled by combining the two following means:

(1) Before the bottles or similar vessels are filled with liquid, they are filled with gas, not from the filling tank as heretofore, but from a distinct reservoir wherein the pressure is at most equal to the pressure of the gaseous atmosphere in the tank augmented by an amount within a limit determined by the pressure head of the liquid in said tank and the filling duct.

(2) During the filling of the bottles or similar vessels, the gas from the bottle and the foam that may have formed therein are led to a separate tank submitted to the same maximum pressure as specified above.

Moreover, as there will be now no drawing off of successive amounts of gas from the tank, the pressure therein will therefore be maintained constant and undisturbed, which conditions also help to keep gassy liquids saturated.

As the filling liquid, on the other hand, is no longer contaminated by back flows to the tank of possibly polluted bottle atmosphere and, casually, of foam, the liquid got in the bottles can be identical in any respect to the liquid with which the filler tank is supplied, a point which is of particular importance for alimentary or liquids of special compositions.

The devices for applying this method are adapted as well for the construction of fillers specially designed to carry out said method as for readily modifying existing fillers by only adding thereto a gas and foam return tank, or chamber, a tank or chamber for counter-pressurizing the bottles, two pressure-balancing devices and elements to modify the cocks of the filling heads. The chief modifications to be made to the cocks consist in adapting the former vacuum duct to operate as a counter-pressure duct and, when vacuum is wanted, providing through the end of the cock plug a new evacuating duct connected to vacuum through an auxiliary cock. In this way, the device for operating the filling cocks remains exactly the same and the cycle of operation is unchanged. If need be, the additional manoeuvre of the vacuum auxiliary cocks has to be provided for.

Another object of the invention is to provide a device for transforming an isobarometric filler having three-way cocks circumferentially spaced around the rotating plate of the filler, said device comprising a collector ring mounted on said rotating plate and at the periphery of which are secured said three-way cocks, said collector ring being formed with a counterpressure and return chamber connected to the counterpressure and return duct of each cock, an annular filling chamber connected through one or more pipes to the original filling tank of the filler and to the filling duct of each cock and a common release chamber for replacing the individual snifting devices of the original filler which chamber is connected to the snift duct of each cock and the outlet pressure of which is arranged to be controlled, the counter-pressure and return chamber being moreover operatively connected, although not actually communicating therewith, to the gaseous atmosphere of the original filling tank through an isolating pressure regulator adapted to maintain at a constant value the ratio of the pressure in said tank to the pressure in said counter pressure and return chamber, each original two-duct spout being replaced by a spout having a central duct and around the latter an annular space extending down to the level of the gasket of the bottle centering bell and in which space open the counter pressure and return duct and the snift duct of the cock. The gaseous atmosphere of the tank may be constituted by a gas different from the gas in the counter pressure and return chamber.

The above and other features of the invention will be made clear in the following description of some embodiments of the invention, with reference to the accompanying drawings, in which.

Figure 1:
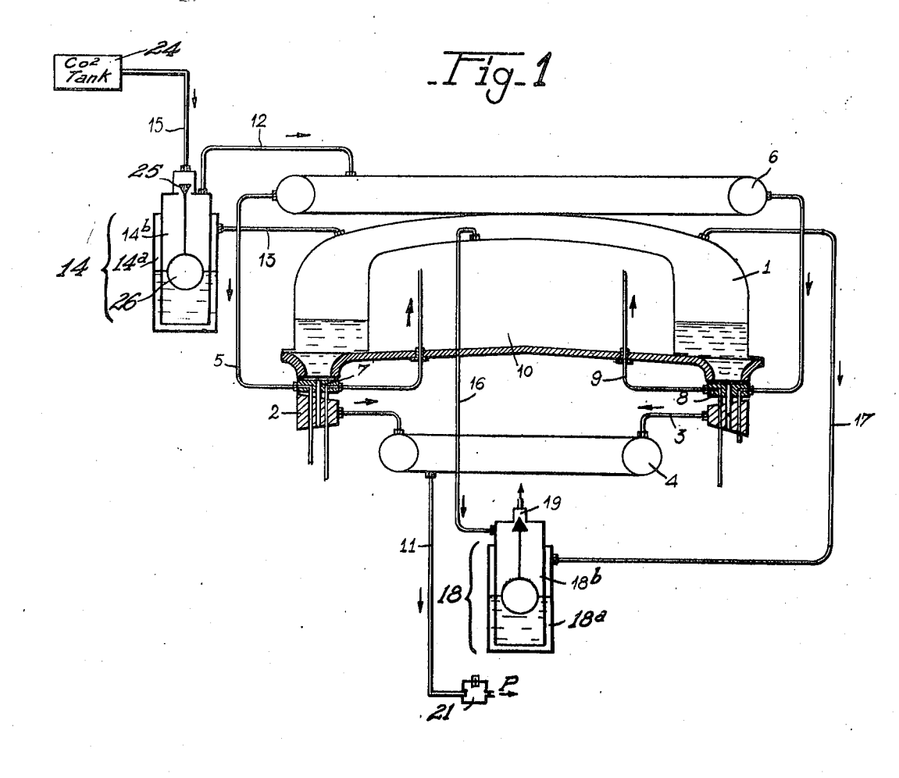
Figure 1 is a diagrammatic sectional view of the liquid, vacuum, counter pressure and gas-and-foam return tanks or chambers together with the pressure-balancing means in a beer filler.

The filler comprises an annular tank 1 connected at its bottom with an assembly of circumferentially spaced filling heads, not shown in Fig. 1, but diagrammatically denoted by the plugs 2 of their cocks. These cocks are, for example, multiple-way plug-cocks such as will be described hereafter and through which the inside of the bottles to be filled can be connected according to the following sequence of operations:

First, the bottle atmosphere is connected through a tube 3 with a vacuum chamber 4;

Then, said atmosphere is connected through a tube 5 with a carbonic gas chamber 6;

Finally, through a duct 7 provided in the body 8 of the cock, the beer from tank 1 is allowed to flow into the bottle, while the bottle atmosphere and the foam that may have formed therein are allowed to return to a foam-collecting tank 10 through a duct in the plug and a pipe 9; in a filler as illustrated in Fig. 1, said tank 10 is formed by an auxiliary bell-shaped wall simply secured with a tight joint within the dome of a transformed existing filler.

The vacuum chamber 4 is connected, in a known manner, with a vacuum-pump 21 through a pipe 11.

The carbonic gas chamber 6 is fed with gas under pressure through a tube 12 which is connected to an isolating pressure-balancing apparatus 14.

This pressure-balancing apparatus or hydraulic pressure regulator 14 is connected to a source 24 of carbonic gas under pressure through a pipe 15 and a valve 25 which opens when the float 26 operated by the liquid in the apparatus 14 rises. This hydraulic pressure regulator 14 is connected through a pipe 13 to the gaseous atmosphere at the upper part of tank 1. The hydraulic regulator 14 may be so adjusted as to fix a constant value for the difference between the pressure of the gaseous atmospheres in tank 1 and chamber 6 and, since the counter pressure in the bottles is under control, the rate of the filling flow may be controlled as wanted; any maximum "counter pressure" may be selected and, preferably, the chosen maximum value will be equal to the pressure of the gaseous atmosphere in the upper part of tank 1, augmented by the pressure head resulting from the liquid-column between the level of the liquid in the tank 1 and the level of the liquid in the bottle when filling is completed.

The foam-collecting tank 10 is also provided at its top with a tube 16 connected to a pressure-balancing apparatus 18 similar to the above mentioned hydraulic regulator 14. The hydraulic regulator 18 is opened to free atmosphere through a discharge means 19 and connected through a pipe 17 to the gaseous atmosphere in the upper part of tank 1. The regulator 18 may be adjusted to maintain a selected constant pressure difference between the atmosphere in the foam tank 10 and the gaseous atmosphere in tank 1. This pressure difference may be adjusted with a sufficient precision for automatically stopping the filling of the bottle at a predetermined level, since the pressure in the tank 10 has only to be maintained exactly equal to the pressure of the gaseous atmosphere in the upper part of tank 1 augmented by the constant pressure head between the level of the liquid in tank 1, which level is automatically fixed, and the level of the liquid in the full up bottle. The well known arrangement for this purpose is simply to provide, for the liquid inlet into each bottle, a filling tube extending down the neck of the bottle low enough for the end of the tube being immersed into the liquid at the end of filling. The above mentioned pressures are so chosen as to avoid as far as possible any violent stirring effect on the filling liquid, a condition which is strongly recommended when sealing with easily deteriorating liquids such as beer.

Figure 2:
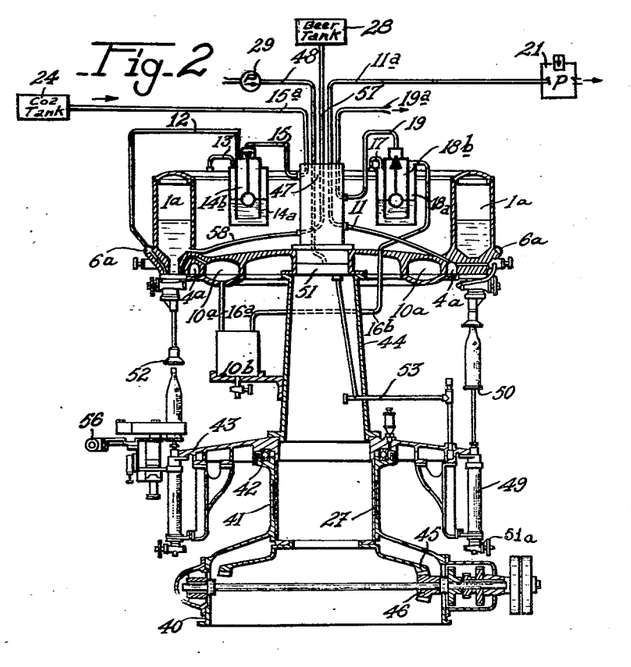
Figure 2 is a diagrammatic sectional view showing the general arrangement of the parts of a filler of this type.

Besides the cock means the purpose of which has been described above, a filler wherein said method is applied comprises a base 40 from which extends upwards a column 41 provided at its top with a ball thrust bearing 42 supporting a pivoting disc 43 and a column 44 carrying the various tanks or chambers. The column 44 and the disc 43 are continuously rotated by means of a conical gear-wheel 45 secured at the bottom end of a sleeve 27 attached to the disc 43 and accommodated within the column 41. This gear-wheel 45 meshes with a pinion 46 rotated through a suitable drive by a motor not shown. At the upper end of the column 44 is arranged a rotating fluid-tight distributing joint 47 into which terminate the vacuum pipe 11a connected to the vacuum pump 21, the counter pressure gas pipe 15a connected to the carbonic gas source 24, the beer inlet pipe 57 connected to the beer tank 28, the discharge pipe 19a of the second pressure-balancing apparatus, and a compressed air pipe connected to the pump 29 for the successive actuation of the raising pistons of the bottle rests 50, which pistons reciprocate in cylinders 49 regularly spaced at the circumference of the disc 43. The rotating joint 47 permits the compressed air to be distributed to the cocks 51 arranged at the bottom of each cylinder 49 for controlling the inlet and outlet of the compressed air into and from said cylinders 49 in timed relationship with the rotation of the machine in order to tightly engage the bottle necks into the bell-and-slide filling heads 52 and remove the bottles therefrom in due time. Of course, each cock 51 is either connected to the joint 47 through individual pipes or to a manifold fed through a pipe 53 from the joint 47. The cocks 51 are operated in the known manner by means of fixed dog pins the axes of which are located on the respective radii 37 for the admission of the counter pressure 38 for the filling liquid inlet and 39 for the shut-off at the end of filling (see Fig. 3), said dog pins engaging stars 75 as the machine rotates.

As mentioned above, the stationary parts of the fluid-tight distributing joint 47 are connected to pipes 11a, 15a, 19a, 48 and 57. The rotating parts of the joint 47, which are secured to the pivoting machine top assembly supporting the gassy liquid tank 1a, the counter pressure gas chamber 6a, the vacuum chamber 4a and the foam-collecting chamber 10a, are provided with a pipe 15 connected to the discharge port 14b of the first pressure regulator and a pipe 19 connected to the discharge port 18b of the second pressure regulator. A pipe 58 is connected with the pipe 57 for feeding the gassy liquid tank 1a and a pipe 11 permanently communicates with the tube 11a to connect the vacuum chamber 4a to the vacuum pump 21. As shown in the drawing, the top assembly of the machine carries the two pressure hydraulic regulators the outer spaces 14a and 18a of which are respectively connected through pipes 13 and 17 to the gaseous atmosphere of tank 1a. The space 14b of the first regulator is connected through a pipe 12 to the counter pressure chamber 6a. The space 18b of the second regulator is connected through a pipe 16b to an intermediate auxiliary foam tank 10b connected in turn through a pipe 16a to the foam-collecting chamber 10a.

Figure 3:
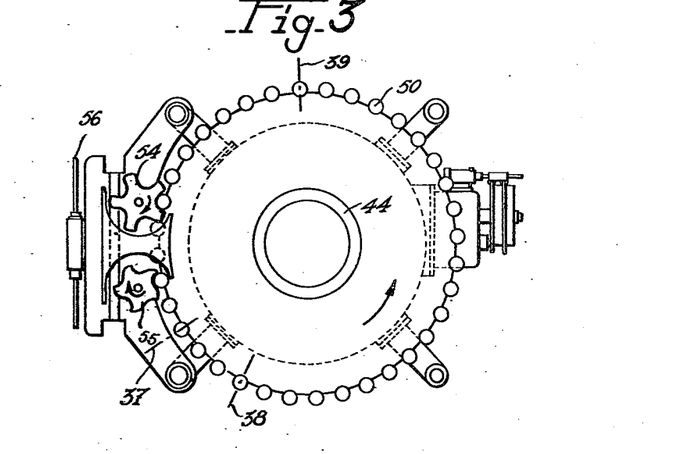
Figure 3 is a diagrammatic plane view of the same filler, the upper part being removed.

The machine comprises also a bottle infeed star 54 taking the bottles from a conveyor not shown and placing them in the right position on each rest 50 when the latter are in their lower position. In the same position, the discharge star 55 provided on the machine takes off the filled bottles and feeds them to another conveyor which also is not shown. The movements of the infeed and discharge stars 54 and 55 are synchronized with the movement of the conveyors and of the machine through a mechanical drive 56.

The operation of the filling heads, infeed star, raising cylinders, discharge star, etc., is well known in the art and therefore will not be more fully described hereafter, nor the means used to feed beer for instance into the tank 1a to make up for the beer drawn off.

Figure 4:
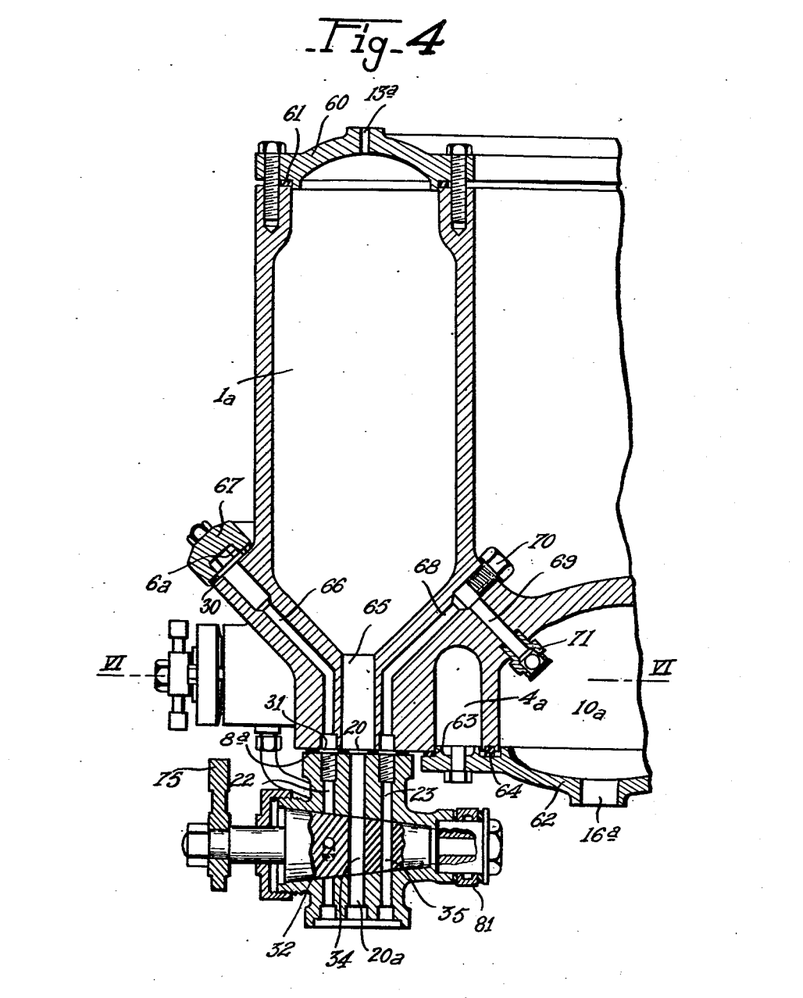
Figures 4 and 5 are sectional views at a greater scale showing the upper part of the filler illustrated in Fig. 2, at the location of the cocks.
Figure 5:
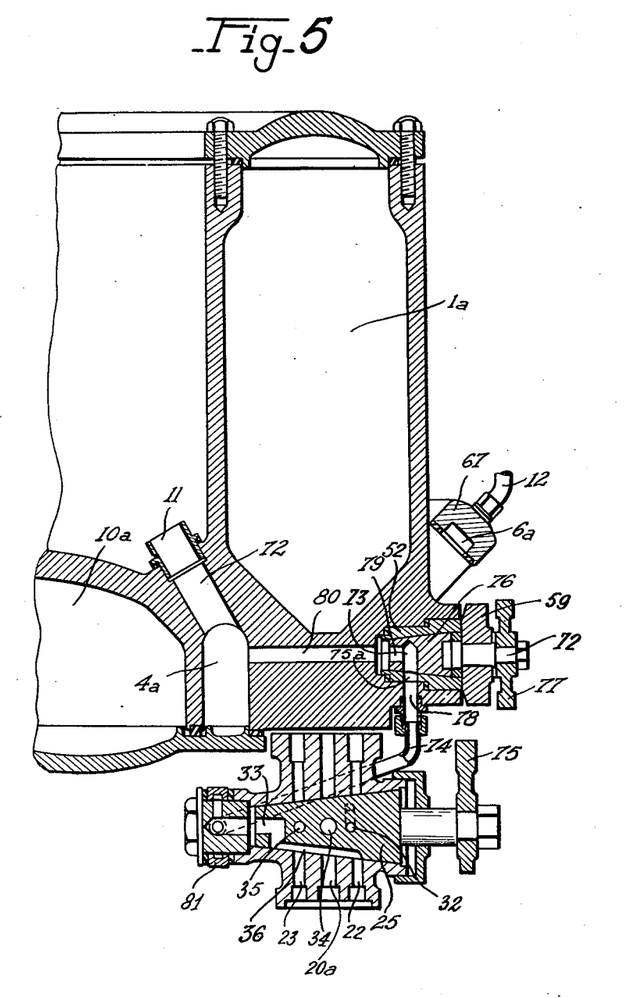
Figure 6:
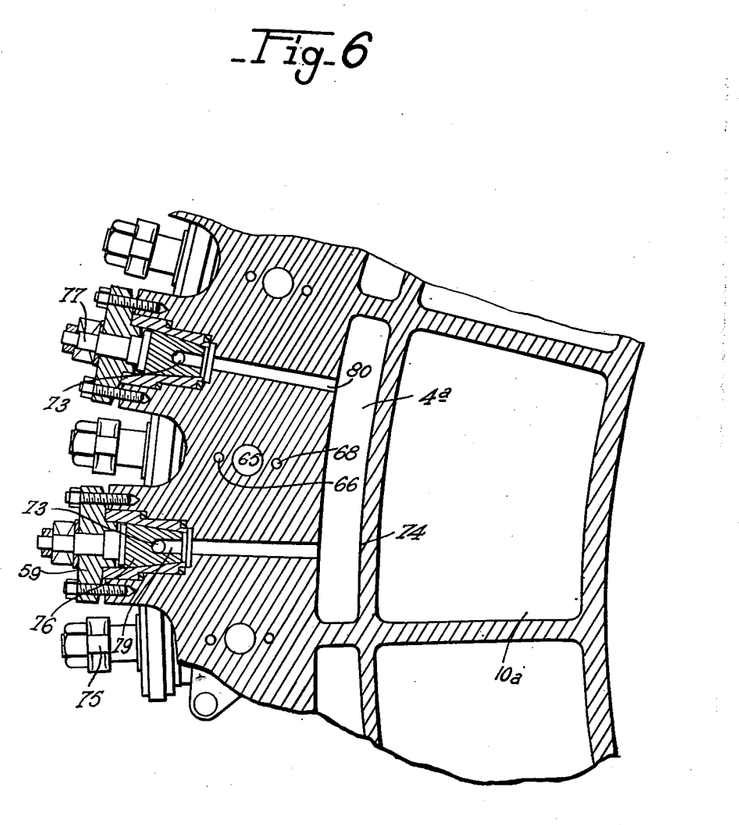
Figure 6 is a section, partially broken away, taken on the line VI—VI of Fig. 4.

Referring now to Figs. 4 to 6, the top assembly of the machine wherein the tanks and chambers are accommodated is made of a casting provided with open channels. One channel will form the tank 1a and is closed therefor by a bolted annular cover 60 clamped over a sealing joint 61. Said cover is provided with a hole 13a for the connection of the pipe line 13. The bottom of said casting is formed with a channel which provides the vacuum chamber 4a adjacent another channel which provides the foam-collecting chamber 10a. These two annular channels are closed by a common bolted cover 62 clamped over sealing joints 63 and 64. The counter pressure chamber 6a is formed by an annular trough 67 the edges of which are applied on a sealing joint 30 and which is clamped by means of nuts screwed on studs. This trough bears on a frusto-conical surface through which open all the counter pressure ducts 66 at the location of each filling head.

At the location of each filling head, the casting is formed with ducts. Ducts 65 open directly into the tank 1a and connect said tank 1a to the corresponding duct 20a of the cock body through a hole 20 of a joint 8a to permit the discharge of beer. The ducts 66 extending similarly to a hole 31 of the joint 8a permit the counter pressure fluid to flow into the duct 22 in the cock body. Another duct 68, one end of which is stopped by a screw plug 70, is connected to a duct 69 extending at right angles from said duct 68 to open into the foam-collecting chamber 10a through a non-return valve 71. Said duct 68 thus connects the foam-collecting chamber 10a to the duct 23 in the cock body. Between each pair of cocks, the vacuum chamber 4a is connected to the housing of a vacuum cock through a duct 80.

This vacuum cock is designed in the form of a special cock distinct from the counter-pressurizing and filling cock in order to simplify the operation of the latter, and in order that it may be put out of operation when vacuum is not wanted. The vacuum cock comprises a conical plug 76 engaging a sleeve 52 tightly fitted into the housing whereinto the duct 80 opens. Said sleeve and plug are held in position by a bored cap 59 fixed to the tank body by means of bolts. Through the bore of said cap extends the pin 72 operating the plug 76 and provided at its outer end with an operating star 77 the branches of which, when the filler assembly rotates, engage fixed dog pins similar to those located on the radial axes 37, 38 and 39 and causing the cock to open and close. For this purpose, the plug is axially bored with a hole 79 which opens in front of the duct 80. This hole 79 communicates with a radial bore 73 in the plug 76, which bore may be brought when the cock is open in register with a side hole 75a of the plug sleeve 52, the latter being in line with a side bore 78 of the filler body connected through a tube 74 to the body of the main cock.

The main cock body is provided with three parallel ducts, that is a central duct 20a and two lateral ducts 22 and 23. The duct 20a is connected to the plunger tube, not shown, of the filling head and is provided for the filling liquid flowing therethrough. The duct 22 is in line with the counter pressure duct 66. The duct 23 is in line with the foam return duct 68. The connecting fitting 81 at the end of the tube 74 is screwed on the smaller end of the seat of the plug 25. In the smaller end of the plug is provided an axial bore 33 which is radially connected to a groove 36 cut in the lateral conical surface and extending axially to the aperture of the three ducts 20a, 22 and 23, so as to establish a wide communication for an easy evacuation of the bottles. The plug is formed, moreover, with two parallel bores 34 and 35 adapted to simultaneously open the communication in ducts 20a and 23. A third duct 32 is at an angle with the two former ones so that, when the operating star 75 of the plug 25 engages the position-controlling dog pins as the filler unit rotates, the plug 25 may be caused to take three different positions, that is: a shut-off position wherein the groove 36 is in register with the apertures of the ducts 20a, 22 and 23; while the main cock is in this position, the vacuum cock 76 opens and closes after the bottle has engaged the filling head; a first rotation then brings the duct 32 in line with duct 22, and the counter pressure builds up in the bottle; a second rotation cuts off the counter pressure connection and brings the ducts 34 and 35 in line with the ducts 20a and 23; rotation in the reverse direction brings back the plug to its initial position and cuts off all the communications as the vacuum cock 76 is closed.

Such a construction of the machine permits of reducing the dimensions of the tank 1, owing to the beer being quiet therein and also to the fact that the tank atmosphere cannot be polluted either by foam nor by air ingress.

As already mentioned with reference to Fig. 1, existing fillers may be modified by means of devices for applying the above described and specified method, without adding to such fillers any separate vacuum, counter pressure and foam-collecting tanks or chambers.

Any beer fillers, in particular, comprise three-way filling cocks, one way of which is for the necessary pressurizing and the two other ways, simultaneously opened, for the filling and the return of the foam expelled together with the bottle atmosphere.

For the transformation of such a filler, it suffices to modify the cocks as follows: a groove similar to groove 36 (Fig. 5) adapted to connect together the three duct apertures on the outlet side of the filling head is cut in the cock plug, an axial bore such as bore 33 of Fig. 5 is drilled at one end of the plug and is then connected to the aforesaid groove. On the bottom of the cock body is fitted a connecting-piece for a tube similar to tube 74 (Fig. 5) leading to the vacuum valve.

Figure 7:
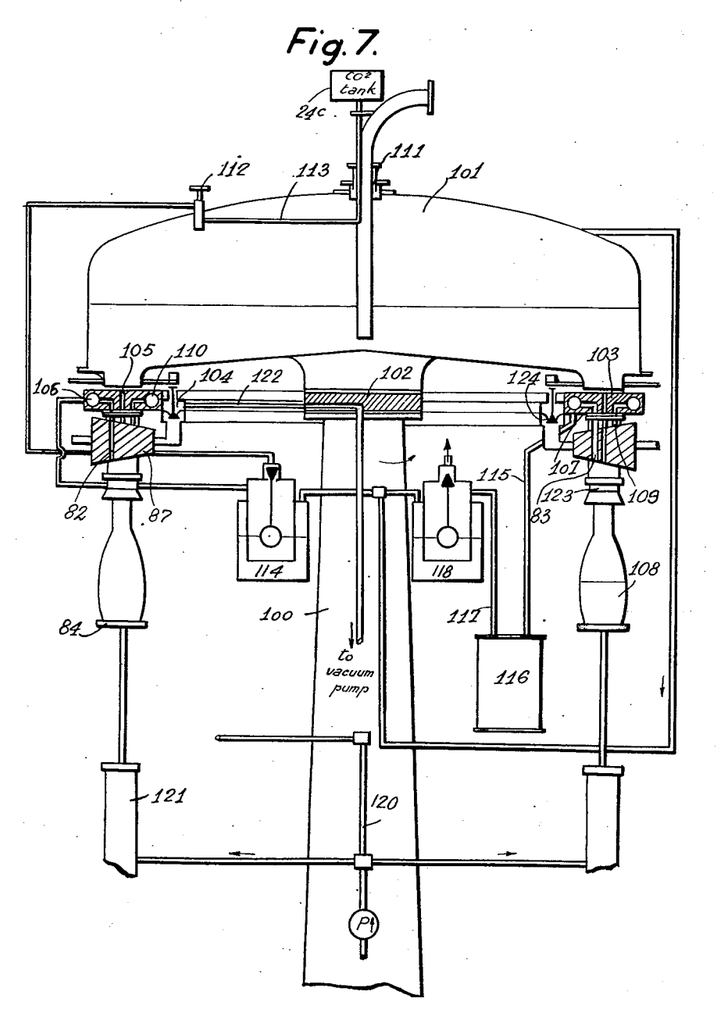
Figure 7 is a diagrammatic sectional view of an embodiment of the filling device used for the modification of an existing filler.

Between the central column 100 of the filler and the filling liquid tank 101 is inserted a distance piece 102 for raising said tank. At the periphery of the tank is interposed a ring 103 to which the filling heads 123 are fitted after their cock plugs have been modified as described before. This ring is provided with bores 105 for the liquid flow and with bores 109 for the counter pressure fluid and 107 for the return flow from the atmosphere of the vessels 108. The bores 109 are located in line with the existing counterpressure ducts 82 in the cocks 87. The bores 107 are located in line with the existing return flow ducts 83 of said cocks. Said bores 109 and 107 respectively open in chambers 106 and 110. The chamber 106 is the counter pressure chamber and the chamber 110 is the foam-collecting chamber. As described with reference to Fig. 1, the chamber 106 is connected to a pressure regulator 114 connected in turn to a tapping means 112 in the dome of tank 101 which tapping means is also used for pressurizing the liquid to be drawn from this tank. This pressure tapping means is connected in turn through a pipe 113 passing through a stuffing-box 111 to a pressure gas source 24c.

The chamber 110 is connected to a tube 115 which leads to a foam vessel 116, which is connected through a tube 117 to a pressure regulator 118 exhausting into the atmosphere. It is convenient, for avoiding any leakage in the occurrence of bottle breakage for example, to provide a non-return valve in each return flow duct of the cocks. Within the column pass, provided with suitable stuffing-boxes, the vacuum pipe 119 and the feed pipe 120 delivering pressure air to the raising cylinders 121 at the rests 84 of the vessels 108.

The tube 119 is connected through a tube 122 to a vacuum chamber 104. Said vacuum chamber communicates with the chambers of valves 124 operated through top rocker arms, under which the valve-chambers connect said vacuum chamber 104 to the filling cocks of each filling head.

Figure 9:
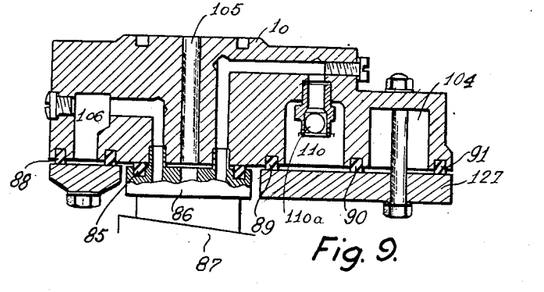
Figure 9 is a section showing the same ring at the location of the connections with the filling cock.
Figure 10:
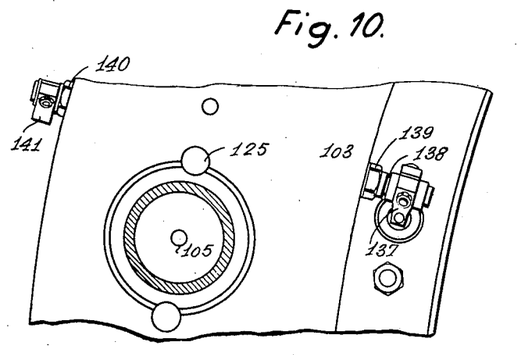
Figure 10 is a partial plane view of the same ring.

The ring 103 is a flat annulus and is preferably made of stainless bronze forged and machined so as to form thereon regularly spaced lands bearing on the undersurface of the liquid flow outlets of tank 101; each land has a hole 105 bored through its center (Figs. 9 and 10). On either side of said lands are provided bolt holes 125 for the tightening of sealing joints 85 by bolts securing the flanges 86 of the filling cocks to the lower face of the ring and clamping the latter to the tank 101 with said lands bearing on the underside of said tank.

Figure 8:
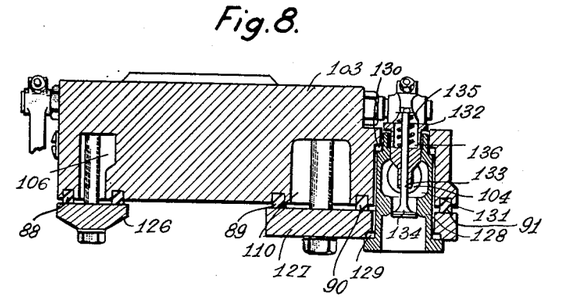
Fig. 8 is a section at a greater scale of the ring inserted between the filler tank and the cock assembly.

The under face of the ring has cut therein three grooves (Figs. 8, 9) constituting respectively the chambers 106, 110 and 104. The grooves 106 and 110 are closed by annular covers 126 and 127 clamped over sealing joints 88 to 91 by studs and nuts. The cover 127 is provided with three joints, two outer joints 89, 91 enclosing therebetween the chambers 110 and 104, and an intermediate joint 90 separating said chambers. The cover 127 is provided with threaded bores wherein are screwed the vacuum valve-boxes 128, with a joint 129 inserted between the bottom flange of each valve-box 128 and the cover 127. Another joint 130 is inserted between the valve-box 128 and the bottom of the chamber 104. Thus sealing is ensured. In the chamber 110 are arranged ball valves 110a at the outlet of the return flow ducts, for preventing any leakage to free atmosphere if a bottle breaks or has not correctly engaged the head. The vacuum valve chamber has two opposite ports 131 opening into the chamber 104. A valve guiding socket 132 is screwed into the valve-box 128. The valve rod 133 slides in said socket. The valve head 134 is urged against its seat by a spring 135. The valve rod 133 passes through a cup 136 formed in the guiding socket for receiving a lubricating and sealing fluid. Said rod is adapted to be engaged by a cam member 137 secured to a shaft 138 extending radially through the ring 103 and journaled in bearings 139 and 140. These bearings are fitted to the ring 103. The rocking movements of the rod 138 are caused by a cam member 141 secured to said rod engaging a fixed dog pin similar to those located on axes 37 to 39 of Fig. 3 as the tank assembly rotates, thus causing the vacuum valve 134 to open at the appropriate time in the operating cycle.

In the particular instance of beer filling, in view of the complete separation of the beer, counter pressure and foam-collecting tanks or chambers, the counter pressure fluid may conveniently be an antiseptic fluid such as sulfur dioxide. This fluid flows from the counter pressure chamber to the foam-collecting chamber through the bottle wherefrom it is expelled during filling; it may easily be recovered at the outlet from the foam-collecting chamber.

The application of the method described and specified above may be extended, by using other types of machines, non automatic for instance, to delicate filling conditions where difficulties arise from the nature of the liquids and gases handled or of the kind of vessel to be filled, owing to the perfect control of the pressures in the various spaces, which permits to adjust as wanted the rate of flow of the filling liquid, and to the selection of the gases contained in separate enclosures.

Such a pressure-balanced filling method therefore has the following advantages:

No air in the vessels to be filled when they are evacuated before filling, whilst they engage the filling heads for example in a gas-tight manner, so that no air ingress is possible between the moment they are connected to vacuum and the moment they are connected to the counter pressure fluid;

The vessels to be filled may be counterpressurized with a gas different from the gas surmounting the filling liquid, and the former may be a sterile or sterilizing gas or a gas having no physical or chemical action on the filling liquid; an isolating atmosphere can thus be created above the filling liquid in the vessel, which permits of proceeding quietly with the stopping after the filled vessel has been taken off from the filling head;

The counter pressure in the vessels may be selected as required, either equal to the filling tank atmosphere pressure, as in the so-called isobarometric fillers, or greater or smaller than said filling tank atmosphere pressure;

After the counter pressure has been established in the vessel, a different pressure may be created therein during filling, which pressure may be also different from the pressure of the filling tank atmosphere, this new pressure being at most equal to the maximum specified above, that is the sum of the pressure in the filling tank and the pressure head of the liquid between the level in the filling tank and the level in the vessel being filled; consequently, the vessels can be filled up to a constant level determined with a high precision; if however the filling operation is stopped by other means, the rate of flow of the filling fluid may be controlled by selecting a suitable value of the counter pressure;

The filling tank cannot be polluted by gas or foam returning from imperfectly washed vessel;

If the vessels to be filled have been previously evacuated and since the return flow is quite separate, the counter pressure gas can be recovered if said gas is more or less costly, or if it is noxious when exhausted in the open air;

A tank assembly with four separate chambers as described above may be provided in the place of the single tank of any type of filler, or arranged on an existing filler, whether said filler has plug-cocks or disc-cocks, or any other opening and closing means for the liquid and gas ducts, and whether said cocks are simple or complex, provided the piping is arranged according to the scheme also described above; an ordinary filler may thus be readily and cheaply transformed into a pressure-balanced filler;

It is guaranteed that the liquid supply to the filling tank will be perfectly regular and equal to the volume of liquid drawn off, since the filling tank is a simple tank without pressure release and thus any liquid outflow to the vessels arrived in the filling position causes a liquid inflow of exactly the same volume as said outflow, which is not the case in the so-called isobarometric fillers wherein the tank is fed only when the pressure release, which is necessarily provided, discharges the excess pressure caused by the gases driven back to the tank when the vessels are being filled;

Such a machine used in particular for beer filling permits of keeping quite unaffected the chemical and biological composition of this liquid which thus can be bottled in exactly the same state as it is in the manufacture vat.

Figures 11, 12:
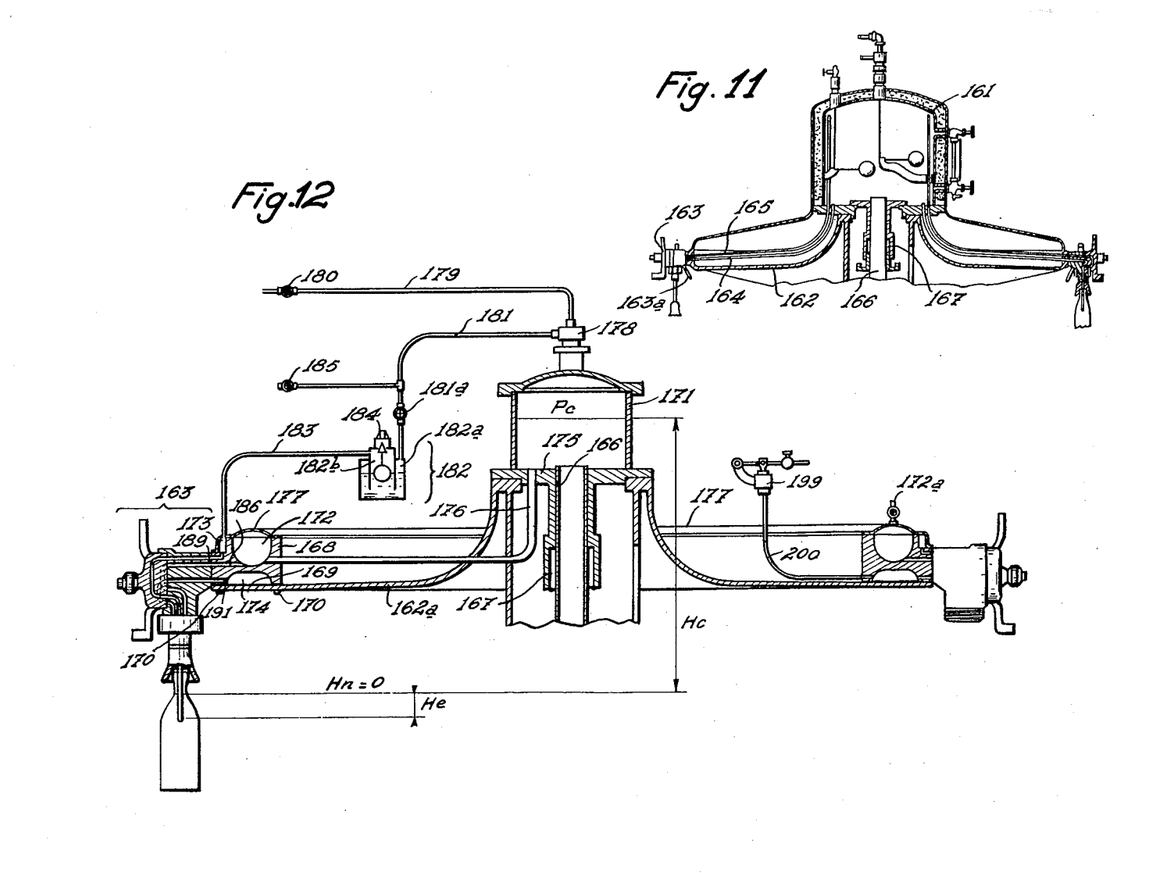
Figure 11 is a diagrammatic partial section of a conventional isobarometric filler used for drawing gassy drinks.
Figure 12 is a sectional view, at a greater scale, of the filler illustrated in Fig. 11 after having been transformed according to the invention.

Referring now to Fig. 11, there is illustrated a usual isobarometric filler for gassy liquids, such as gassy water. Such a filler comprises a filling tank 161 mounted on a rotating plate 162. Each filling head is provided with a disc-cock 163 connected through a piping 164 to the bottom of the tank 161 for conveying the liquid therefrom to a bottle to be filled, and through a piping 165 to the upper part of the tank 161 above the level of the gassy liquid, the latter piping having two functions, that is, building up a counter pressure within the bottle from the gaseous atmosphere of the tank 161 and allowing the return flow of the counter pressure gas to said gaseous atmosphere from the bottle when being filled. Thus the filler is adapted for isobarometric operation. The gassy liquid is fed to the tank 161 through a central conduit 166 which passes through a stuffing-box 167 for a sealing connection between the outer surface of said conduit and the rotating plate 162.

Each cock 163 has connected to it, moreover, a third piping for snifting off the excess gas from the bottle at the end of filling, which piping opens in a snifter 163a, and each cock has three ducts respectively corresponding to the counter pressure piping 165, the filling piping 164 and the snifting piping.

The transformation of the filler illustrated in Fig. 1 for the purpose of using it according to the process of the present invention is shown in Figs. 12 to 15. The rotating plate 162 is modified, as shown at 162a, by cutting off its rim for mounting on the plate a collector ring 168 clamped thereto over a sealing joint 169 by means of bolts 170. Moreover, above the rotating plate is mounted a turret 171 for pressurizing the filling collector, which turret is fed with gassy liquid through the pipe 166 passing through the stuffing-box 167. In the collector ring 168 are formed three annular chambers, the gassy liquid chamber 172, the counter pressure and return flow chamber 173, and the common pressure release chamber 174 which replaces the individual snifter 163a of the filling heads, thus providing the same relief conditions for all these heads.

The ports in the bottom member 175 which originally supported the tank 161 and through which passed the pipes 164, 165 are stopped up, one at least however being left for the passage of one or more pipes 176 connecting the feeding turret 171 to the gassy liquid filling chamber 172. Said filling chamber 172 and the counter pressure and return flow chamber 173 are closed by a common cover plate 177.

At the top of the turret 171 is mounted a gas inlet stuffing-box 178 through which passes a pipe 179 fed through a cock 180 with the turret pressurizing gas. To the stuffing-box 178 is also connected a piping 181 for connecting the gaseous atmosphere in the turret 171 with the compartment 182a of a return flow pressure balancing apparatus 182, the compartment 182b of which apparatus is connected through a pipe 183 to the counter pressure and return flow chamber 173, the return flow being exhausted through the discharge port 184 under the control of the valve operated by the float of the pressure balancing apparatus. In the piping 181 is inserted a cock 181a which is operative when open to transmit the pressure of the gaseous atmosphere in turret 171 to the pressure-balancing apparatus 182. A relief cock 185 for the turret 171 is also connected to the piping 181 in order to properly set the pressure level in the turret. Moreover, on the filling chamber 172 is mounted a blow-cock 172a permitting to blow off any gaseous atmosphere from this chamber and thus filling it up with liquid only.

At each filling head location is mounted on the collector ring 168 the same disc-cock 163 which was mounted on the original machine illustrated in Fig. 11. For this purpose, the collector ring 168 is formed with a duct 186 which opens into the filling chamber 172 and is in line with the duct 187 provided in the fixed body 188 of the cock, which duct 187 was connected to the pipe 164 of the original machine. Similarly, a duct 189 is formed in the collector ring 168 to open into the counter pressure and return flow chamber 173, said duct 189 being in line with the duct 190 provided in the fixed body of the cock and formerly connected to the pipe 165 of the machine before transformation. A third duct 191 formed in the collector ring 168 connects the release chamber 174 to the snifting duct 192 provided in the body of the cock 188. This body also has three vertical ducts 187a, 190a, 192a adapted to be respectively connected through the cock moving member to the ducts 187, 190, 192. The vertical filling duct 187a extends into the spout 193 and opens at the lower part of said spout through radial ports. The ducts 190a and 192a open in an annular space 193a formed within the spout and extending downwards to the level of the sealing ring 193b of the bottle centering bell so as to come in communication with the inside of the bottle.

On a pin 194 carried by the body 188 is mounted a rotatable disc 195 provided with two operating arms 196 and 197. This rotatable disc is provided with a duct 187b (Fig. 14) adapted to connect together the ducts 187 and 187a, a duct 190b (Figs. 13 and 14) adapted to connect together the ducts 190 and 190a, and a duct 192b (Fig. 15) adapted to connect together the ducts 192 and 192a.

A perforated gasket 198 is mounted between the rotatable disc 195 and the body 188.

The outlet pressure of the release chamber 174 is controlled in relation to the atmospheric pressure by a relief valve 199 connected through a pipe 200 to said release chamber. If said pressure is required to be controlled in accordance with the filling pressure, the valve 199 will be replaced by a pressure-balancing apparatus connected in a similar way as the apparatus 182.

Figures 13, 14:
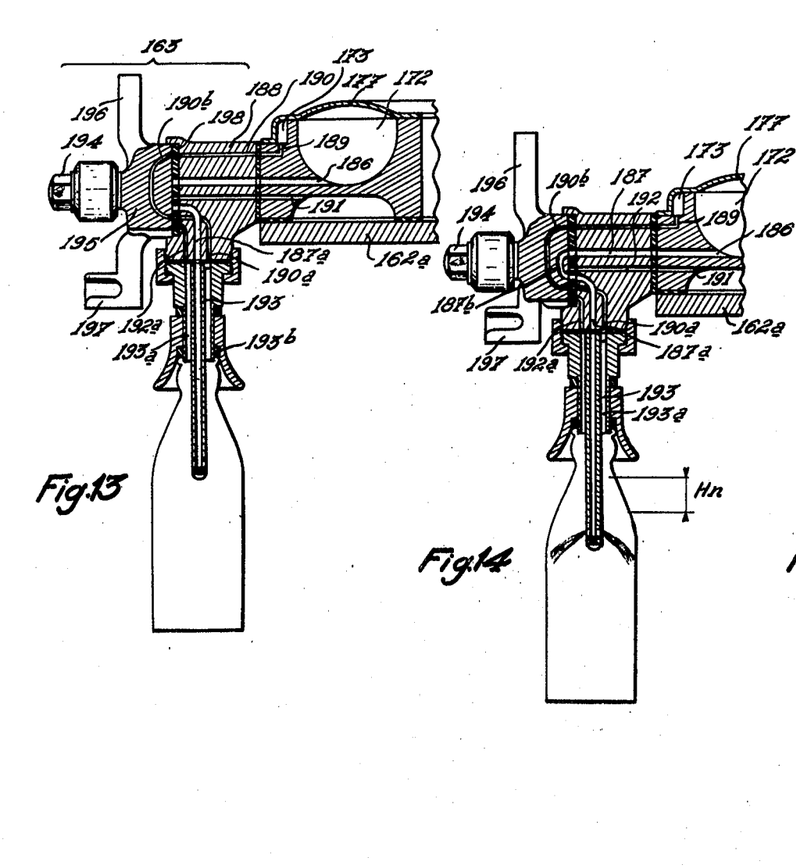
Figures 13 to 15 are partial sectional views at a greater scale of a filling head of the filler illustrated in Fig. 2 in various steps of operation, that is, respectively, bottle pressurizing, filling and final snifting.

The thus transformed machine operates as follows:

Before setting the machine in motion, the cock 181a is actuated to transmit the pressure $Pc$ of the gaseous atmosphere in turret 171 to the compartments 182a, 182b of the pressure-balancing apparatus 182, and these compartments are immediately isolated from each other. As soon as the cock 163 corresponding to the first bottle opens, the latter is pressurized through the ducts 189, 190, 190b, 190a and the space 193a (Fig. 13) to a pressure equal to $Pc$. Then, as the cock 163 comes to the position illustrated in Fig. 14, the filling liquid tends to flow through the ducts 186, 187, 187b, 187a and the central duct of the spout under the action of the pressure $Pc$ augmented by the hydrostatic pressure corresponding to the height $Hc$ between the level of the gassy liquid in the turret 171 and the final level of the liquid in the filled bottle plus the height $He$ between said final filling level and the bottom outlet of the spout. The liquid falls freely until its level in the bottle reaches the spout outlet. From this moment, it will flow under a total head equal to the pressure $Pc$ augmented by the hydrostatic pressure corresponding to said height $Hc$ plus the height $Hn$ between the final filling level and the actual level of the gassy liquid in the bottle. Simultaneously, the driven out gas reaches the return chamber 173 through the chamber 193a and the ducts 190a, 190b, 190 and 189 with a pressure $$Pc+Hc+Hn=PR$$

which is operative in the compartment 182b of the apparatus 182. The float in this compartment is lowered since $PR$ is greater than $Pc$ and the discharge port 184 opens. The pressure-balancing apparatus is so adjusted as to cause the inflow of gassy liquid to stop when the desired level has been reached in the bottle, that is when $Hn$ has fallen to zero, the discharge 184 opening only for pressures higher than $Pc+Hc$ minus the loss of head in the cock ducts.

Figure 15:
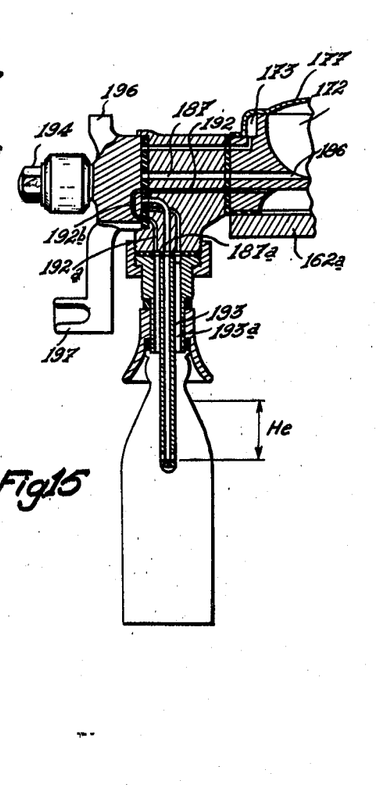

At the moment when the level corresponding to $Hn=0$ is reached, the cock 163 is brought to the position illustrated in Fig. 15, the gas under pressure above the liquid then being snifted off into the common release chamber 174 through the space 193a and the ducts 192a, 192b, 192 and 191.

Without unduly widening the scope of the invention, modifications may be made to the embodiments which have been described and to the operative steps of the forementioned method. More particularly, the filling process for containers is not limited to gassy beverages but is also usable for any liquid and for any container to be filled.

What I claim is:

1. In a filling machine, more particularly for gassy liquids, of the type comprising a filling tank containing the liquid to be drawn off therefrom and mounted on a central column and a multiplicity of filling devices each one of which comprises a spout formed with three ducts and a three-way cock with a rotary plug formed with three ducts one of which, counter-pressure duct, is adapted to connect the gas under pressure of the filling tank with the corresponding duct of the spout while the two others, return and filling ducts, are adapted to simultaneously connect the two other ducts of said spout with said gaseous atmosphere and with the liquid contained in the filling tank, respectively; the improvement which comprises a distance-piece inserted between the central column and the filling tank and formed with a duct connected with a vacuum source, an annular member mounted at the periphery of the filling tank and on which are fitted the multiple three-way cocks carrying the spouts, said annular member being formed with three annular chambers adapted to be used respectively as counter-pressure chamber, return chamber and vacuum chamber; for each filling device, a first duct connecting the filling tank to the filling duct of the corresponding three-way cock, a second duct connecting the counter-pressure chamber to the counter-pressure duct of said cock, and a third duct connecting the return chamber to the counter-pressure duct of said cock, said plug being further formed on one of its ends with an axial bore connected to the vacuum chamber and communicating with a radial bore opening on the lateral surface of said plug and which is perpendicular to the two parallel radial ducts of said plug, said plug being also formed with a longitudinal groove cut in its lateral surface for connecting said radial bore with the portion of the three ducts formed in the cock body which are connected to the spout, a valve inserted between said axial duct and the vacuum chamber, means for operating said valve, a tube connecting said vacuum duct to said vacuum chamber; a source of counter-pressure gas connected to the counter-pressure chamber; means for maintaining constant and different from 1:1 the ratio existing between the pressure of the counter-pressure gas and of the filling gas, and means for maintaining constant and different from 1:1 the ratio existing between the pressures of the filling gas and of the returned counter-pressure gas; and means for operating each three-way cock and the operating means of the corresponding vacuum valve synchronously with the general movement of the machine, whereby said machine acts as a non-isobarometric machine.

2. In a filling machine, more particularly for gassy liquids, of the type comprising a filling tank containing the liquid to be drawn off therefrom and a multiplicity of filling devices circumferentially spaced around the rotating plate of the filling machine, each one of which comprises a spout with three ducts and a three-way cock with a rotary plug formed with three ducts one of which, counter-pressure and return duct, is adapted to connect the gas under pressure of the filling tank with the corresponding duct of the spout while the two others, filling duct and snifting duct, are adapted to simultaneously connect the two other ducts of said spout with said gaseous atmosphere and with the ambient atmosphere respectively; the improvement which comprises an annular member mounted on the rotating plate and on the periphery of which are fixed said three-way cocks, said annular member being formed with three annular chambers adapted to be used respectively as counter-pressure and return chamber, filling chamber and common release chamber, at least one pipe connecting the filling chamber to the filling tank; for each filling device, a first duct connecting the counter-pressure and return chamber to the counter-pressure and return duct of the corresponding cock, a second duct connecting the filling chamber to the filling duct of said cock, and a third duct connecting the release chamber to the snift duct of said cock, a spout formed with a central duct and an annular space around said central duct extending down to the level of the gasket of the container centering bell and in which space open the counter-pressure and return duct and the snift duct of the cock; means for controlling the outlet pressure of the release chamber; an isolating pressure regulator operatively connecting the counter-pressure and return chamber to the gaseous atmosphere of the filling tank although said chamber not actually communicates with said atmosphere, with a view to maintain at a constant value and different from 1:1 the ratio of the pressure in said tank to the pressure in said counter-pressure and return chamber; and means for operating each three-way cock synchronously with the general movement of the machine, whereby said machine acts as a non-isobarometric machine.

3. An isobarometric filling machine, according to claim 2, wherein the means for controlling the outlet pressure of the release chamber comprises a relief valve adapted to connect said chamber with the ambient atmosphere, whereby said outlet pressure is controlled in relation to the atmospheric pressure.

4. An isobarometric filling machine, according to claim 2, wherein the means for controlling the outlet pressure of the release chamber comprises an isolating pressure regulator operatively connecting said chamber to the atmosphere of the filling tank although said chamber not actually communicates with said atmosphere, whereby said outlet pressure is controlled in accordance with the filling pressure.

5. A non-isobarometric method of filling containers, specially bottles, with a liquid which is contained in a filling chamber and which is surmounted by a gaseous atmosphere, consisting in counter pressurizing the container to be liquid filled with a counter pressure gas contained in a chamber different from the filling chamber, filling the container with the liquid and simultaneously collecting the counter pressure gas escaping from the container during the filling thereof in a chamber different from the filling and counter pressure chambers, whereby the filling liquid cannot be polluted by the escaping gas and is simultaneously preserved from becoming unsaturated by a stirring action, and maintaining the ratios between the pressure of the gaseous atmosphere and, on the one hand, the counter pressure, and, on the other hand, the escaping pressure at constant values different from 1:1.

6. A non-isobarometric method of filling containers, specially bottles, with a liquid, more particularly with a gassy liquid, which is maintained under pressure of a pressure gas in a filling chamber, consisting in counter pressurizing the container to be liquid filled with a counter pressure gas contained in a chamber different from the filling chamber, filling the container with the liquid under the action of the pressure gas and simultaneously collecting the counter pressure gas escaping from the container during the filling thereof in a chamber different from the filling and counter pressure chambers, whereby the filling liquid cannot be polluted by the escaping gas and is simultaneously preserved from becoming unsaturated by a stirring action, and maintaining the ratios between the filling pressure and, on the one hand, the counter pressure and, on the other hand, the escaping pressure at constant values different from 1:1.

7. A non-isobarometric method of filling containers, specially bottles, with a liquid, more particularly with a gassy liquid, which is maintained under pressure of a pressure gas in a filling chamber, consisting in counter pressurizing the container to be liquid filled with a counter pressure gas of the same nature as the pressure gas and contained in a chamber different from the filling chamber, filling the container with the liquid under the action of the pressure gas and simultaneously collecting the counter pressure gas escaping from the container during the filling thereof in a chamber different from the filling and counter pressure chambers, whereby the filling liquid cannot be polluted by the escaping gas and is simultaneously preserved from becoming unsaturated by a stirring action, and maintaining the ratios between the filling pressure and, on the one hand, the counter pressure and, on the other hand, the escaping pressure at constant values different from 1:1.

8. A non-isobarometric method of filling containers, specially bottles, with a liquid, more particularly with a gassy liquid, which is maintained under pressure of a pressure gas in a filling chamber, consisting in counter pressurizing the container to be liquid filled with a counter pressure gas having an antiseptic action contained in a chamber different from the filling chamber, filling the container with the liquid under the action of the pressure gas and simultaneously collecting the counter pressure gas escaping from the container during the filling thereof in a chamber different from the filling and counter pressure chambers, whereby the filling liquid cannot be polluted by the escaping gas and is simultaneously preserved from becoming unsaturated by a stirring action, and maintaining the ratios between the filling pressure and, on the one hand, the counter pressure and, on the other hand, the escaping pressure at constant values different from 1:1.

9. A non-isobarometric method of filling containers, specially bottles, with a liquid, more particularly with a gassy liquid, which is maintained under pressure of a pressure gas in a filling chamber, consisting in counter pressurizing the container to be liquid filled with a counter pressure gas contained in a chamber different from the filling chamber, filling the container with the liquid under the action of the pressure gas and simultaneously and directly discharging into the atmosphere the counter pressure gas escaping from the container during the filling thereof, whereby the filling liquid cannot be polluted by the escaping gas and is simultaneously preserved from becoming unsaturated by a stirring action, and maintaining the ratios between the filling pressure and, on the one hand, the counter pressure, and, on the other hand, the escaping pressure at constant values different from 1:1.

10. A non-isobarometric method of filling containers, specially bottles, with a liquid, more particularly with a gassy liquid, which is maintained under pressure of a pressure gas in a filling chamber, consisting in connecting the container to be liquid filled with a source of vacuum in order to eliminate from said container and from the parts of the filling machine connected with said container any matter capable of contaminating the liquid, counter pressurizing the container to be liquid filled with a counter pressure gas contained in a chamber different from the filling chamber, filling the container with the liquid under the action of the pressure gas and simultaneously collecting the counter pressure gas escaping from the container during the filling thereof in a chamber different from the filling and counter pressure chambers, whereby the filling liquid cannot be polluted by the escaping gas and is simultaneously preserved from becoming unsaturated by a stirring action, and maintaining the ratios between the filling pressure and, on the one hand, the counter pressure and, on the other hand, the escaping pressure at constant values different from 1:1.

11. A non-isobarometric method of filling containers, specially bottles, with a liquid, more particularly with a gassy liquid, which is maintained under pressure of a pressure gas in a filling chamber, consisting in counter pressurizing the container to be liquid filled with a counter pressure gas contained in a chamber different from the filling chamber, filling the container with the liquid under the action of the pressure gas and simultaneously collecting the counter pressure gas escaping from the container during the filling thereof in a chamber different from the filling and counter pressure chambers, whereby the filling liquid cannot be polluted by the escaping gas and is simultaneously preserved from becoming unsaturated by a stirring action, and maintaining the ratios between the filling pressure and, on the one hand, the counter pressure and, on the other hand, the escaping pressure at constant values different from 1:1, the counter pressure and the escaping pressure being at the most respectively equal to the sum of the filling pressure and of the hydrostatic pressure corresponding to the difference existing between the level of the filling liquid in the filling chamber and that of the liquid in the container when the latter is liquid filled.

12. In a filling machine for liquids, more particularly for gassy liquids of the type having a multiplicity of filling devices connected respectively to a filling tank containing the liquid and a gas under pressure surmounting said liquid; the improvement which comprises a counter pressure chamber independent from, and without connection with the filling tank, a source of counter pressure gas connected to said chamber and independent from the source of the pressure gas in the filling tank, a chamber for the return of the counter pressure gas escaping from the container during the filling operation and which is independent from, and without connection with said filling tank and counter pressure chamber; for each filling device, means for connecting the container to be filled with the counter pressure chamber, means for operating said connecting means, means for connecting said container filled with counter pressure gas to the filling tank and simultaneously to the chamber for the return of counter pressure gas escaping therefrom, means for operating said second connecting means when the operation of the first connecting means is stopped; and means for maintaining the ratios between the filling pressure and, on the one hand, the counter pressure and, on the other hand, the escaping pressure at constant values different from 1:1.

13. In a filling machine for liquids, more particularly for gassy liquids, of the type having a multiplicity of filling devices connected respectively to a filling tank containing the liquid and a gas under pressure surmounting said liquid; the improvement which comprises a counter pressure chamber independent from, and without connection with the filling tank, a source of counter pressure gas connected to said chamber and independent from the source of the pressure gas in the filling tank, a chamber for the return of the counter pressure gas escaping from the container during the filling operation and which is independent from, and without connection with said filling tank and counter pressure chamber; for each filling device, a multiple-way cock having a body formed with three radial ducts respectively connected at one of their ends to the filling tank and the two chambers, and a plug formed with three radial ducts one of which is angularly offset with respect to the others and is adapted to be connected to the duct of the body connected in turn to the counter pressure chamber while the two other radial ducts of said plug are parallel and adapted to be simultaneously connected to the ducts of the body which are respectively connected to the filling tank and to the return chamber, and a spout formed with three ducts respectively connected to the other ends of the radial ducts of said body; means for operating the plug of each cock synchronously with the general movement of the machine; and means for maintaining the ratios between the filling pressure and, on the one hand, the counter pressure and, on the other hand, the escaping pressure at constant values different from 1:1.

14. In a filling machine for liquids, more particularly for gassy liquids, of the type having a multiplicity of filling devices connected respectively with a filling tank containing the liquid and a gas under pressure surmounting said liquid and wherein each container to be liquid filled is previously connected to a vacuum source for vacuumizing the same; the improvement which comprises a vacuum chamber connected to the vacuum source, a counter pressure chamber independent from, and without connection with the filling tank, a source of counter pressure gas connected to said chamber and independent from the source of the pressure gas in the filling tank, a chamber for the return of the counter pressure gas escaping from the container during the filling operation and which is independent from, and without connection with said filling tank and counter pressure chamber; for each filling device, means for connecting the container to be filled with the vacuum chamber, means for operating said connecting means, means for connecting the air emptied container with the counter pressure chamber, and means for connecting said container filled with counter pressure gas to the filling tank and simultaneously to the return chamber, means for operating said second connecting means when the operation of the first connecting means is stopped, and means for operating said third connecting means when the operation of the second connecting means is stopped; and means for maintaining the ratios between the filling pressure and, on the one hand, the counter pressure and, on the other hand, the escaping pressure at constant values different from 1:1.

15. In a filling machine for liquids, more particularly for gassy liquids, of the type having a multiplicity of filling devices connected respectively with a filling tank containing the liquid and a gas under pressure surmounting said liquid and wherein each container to be liquid filled is previously connected to a vacuum source for vacuumizing the same; the improvement which comprises a vacuum room connected to the vacuum source, a counter pressure chamber independent from, and without connection with the filling tank, a source of counter pressure gas connected to said chamber and independent from the source of the pressure gas in the filling tank, a chamber for the return of the counter pressure gas escaping from the container during the filling operation and which is independent from, and without connection with said filling tank and counter pressure chamber; for each filling device, a multiple-way cock having a body formed with three radial ducts respectively connected at one of their ends to the filling tank and the two chambers, and a plug formed with three radial ducts one of which is angularly offset with respect to the others and is adapted to be connected to the duct of the body connected in turn to the counter pressure chamber while the two other radial ducts of said plug are parallel and adapted to be simultaneously connected to the ducts of the body which are respectively connected to the filling tank and to the return chamber, and a spout formed with three ducts respectively connected to the other ends of the radial ducts of said body, said plug being further formed on one of its ends with an axial bore connected to the vacuum room and communicating with a radial bore opening on the lateral surface of said plug and which is perpendicular to the two parallel radial ducts of said plug, said plug being also formed with a longitudinal groove cut in its lateral surface for connecting said radial bore with the portions of the three ducts formed in the cock body which are connected to the spout, a vacuum cock located between said axial bore and the vacuum room; means for operating each multiple-way cock and the corresponding vacuum cock synchronously with the general movement of the machine; and means for maintaining the ratios between the filling pressure and, on the one hand, the counter pressure and, on the other hand, the escaping pressure at constant values different from 1:1.

16. A filling machine, according to claim 15, comprising an annular member formed with four independent annular chambers respectively used as vacuum chamber, filling chamber, counter-pressure chamber and counter-pressure return chamber, and, for each filling device, with three ducts adapted to respectively connect said tank and said two last chambers with the radial ducts formed in the body of the corresponding multiple-way cock, and with a fourth duct adapted to connect the vacuum chamber to the corresponding vacuum cock, annular covers closing said chambers and annular tight-joints being interposed between said covers and said annular member.

17. In a beer filling machine of the type having a multiplicity of filling devices connected respectively with a filling tank containing the beer and carbon dioxide under pressure surmounting said beer and wherein each bottle to be beer filled is previously connected to a vacuum source for vacuumizing the same; the improvement which comprises a vacuum chamber connected to the vacuum source, a counter pressure chamber independent from, and without connection with the filling tank, a source of air under pressure connected to said counter pressure chamber, a chamber for the return of the air under pressure and of the foam escaping from the bottle, during the filling operation, said last chamber being independent from, and without connection with said filling tank and counter pressure chamber; for each filling device, means for connecting the container to be filled with the vacuum chamber, means for operating said connecting means, means for connecting the air emptied container with the counter pressure chamber, and means for connecting said container filled with air under pressure to the filling tank and simultaneously to the return chamber, means for operating said second connecting means when the operation of the first connecting means is stopped, and means for operating said third connecting means when the operation of the second connecting means is stopped; and means for maintaining the ratios between the filling pressure and, on the one hand, the counter pressure and, on the other hand, the escaping pressure at constant values different from 1:1.

18. A filling machine for liquids, more particularly for gassy liquids, comprising a plurality of chambers well separated from each other and including a vacuum chamber to be connected to each container for vacuumizing the same, a counter pressure chamber to be connected with each vacuumized container for counter pressurizing the same, a filling tank containing the filling liquid which is surmounted by a gaseous atmosphere, said tank being connected with each counter pressurized container for filling the same, a chamber for the return of the counter pressure gas exhausting from the container during the filling operation thereof, and a snift chamber to be connected to the liquid filled container before disengaging said container from the machine with a view to reduce the pressure of the gas surmounting the liquid in the container to a determined value, whereby the number of said separate chambers is equal to that of the steps of a complete filling operation; a vacuum source connected to the vacuum chamber, a source of counter pressure gas connected to the counter pressure chamber, and a source of gas connected to the filling tank and independent from the counter pressure gas source; at least one filling device for receiving one by one containers to be liquid filled and having means for air and liquid tight sealing each container to be liquid filled, each filling device comprising separate circuits respectively connected with said chambers, means for opening and closing said circuits, means for putting separately in action said opening and closing means, and means for timing the action of said last means at the determined moment according to the nature of the filling liquid; means for maintaining the ratios between the pressure of the gaseous atmosphere in the filling tank and, on the one hand, the counter pressure and, on the other hand, the exhausting pressure at constant values different from 1:1; and means for maintaining the pressure in the snift chamber at said determined value.

19. A filling machine, according to claim 18, wherein the counter pressure chamber is used as return chamber.

References Cited in the file of this patent

UNITED STATES PATENTS

| | | |
|---|---|---|
| 1,862,090 | Kantor et al. | June 7, 1932 |
| 2,001,209 | Moberg | May 14, 1935 |
| 2,109,489 | Le Frank | Mar. 1, 1938 |
| 2,174,745 | Hoffman et al. | Oct. 3, 1939 |
| 2,382,696 | De Milleville | Aug. 14, 1945 |